(12) United States Patent
Kaster et al.

(10) Patent No.: US 7,236,907 B2
(45) Date of Patent: Jun. 26, 2007

(54) STEERING ANGLE SENSOR ASSEMBLY WITH PULSE WIDTH MODULATED OUTPUT SIGNAL

(75) Inventors: Robert Kaster, White Lake, MI (US); Darin Rohrkemper, Sterling Heights, MI (US); Eric Stuckey, Farmington Hills, MI (US); Stefan Knoll, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 184 days.

(21) Appl. No.: 11/023,898

(22) Filed: Dec. 22, 2004

(65) Prior Publication Data

US 2006/0136171 A1 Jun. 22, 2006

(51) Int. Cl.
*G06F 15/00* (2006.01)

(52) U.S. Cl. .................... 702/151; 702/189; 702/190; 700/303; 340/465; 701/36; 701/41; 701/200

(58) Field of Classification Search ............. 702/150, 702/151, 189, 190; 700/303; 340/465; 701/36, 701/41
See application file for complete search history.

(56) References Cited

U.S. PATENT DOCUMENTS

| | | | |
|---|---|---|---|
| 5,899,288 A | 5/1999 | Schubert et al. | 180/89.12 |
| 6,097,999 A | 8/2000 | Shal et al. | 701/38 |
| 6,102,151 A | 8/2000 | Shimizu et al. | 180/446 |
| 6,134,491 A * | 10/2000 | Kawagoe et al. | 701/43 |
| 6,148,949 A | 11/2000 | Kobayashi et al. | 180/446 |
| 6,184,637 B1 | 2/2001 | Yamawaki et al. | 318/432 |
| 6,397,134 B1 | 5/2002 | Shal et al. | 701/37 |
| 6,405,113 B1 | 6/2002 | Yamawaki et al. | 701/41 |
| 6,445,983 B1 * | 9/2002 | Dickson et al. | 701/23 |
| 6,490,539 B1 * | 12/2002 | Dickson et al. | 702/150 |
| 6,493,619 B2 | 12/2002 | Kawazoe et al. | 701/41 |
| 6,519,518 B1 | 2/2003 | Klein et al. | 701/41 |
| 6,540,043 B2 * | 4/2003 | Will | 180/404 |
| 6,549,871 B1 * | 4/2003 | Mir et al. | 702/145 |
| 2002/0063543 A1 | 5/2002 | Kanda | 318/433 |
| 2003/0045981 A1 | 3/2003 | Kifuku et al. | 701/41 |
| 2003/0094320 A1 | 5/2003 | Chernoff et al. | 180/54.1 |
| 2003/0102181 A1 | 6/2003 | Takumoto | 180/446 |

OTHER PUBLICATIONS

Will et al., 'Development of a Flexible Platform for Agricultural Automatic Guidance Research', Jul. 1998, UILU Publication, Paper No. 983202, pp. 1-12.*
Burton, 'Innovation Drivers for Electric Power-Assisted Steering: How to control analysis and Systems', Dec. 2003, IEEE Publication, pp. 30-39.*
Noguchi et al., 'Development of Steering Angle and Torque Sensor of Contact-type', Jan. 2004, Furukawa Review, pp. 36-41.*

* cited by examiner

*Primary Examiner*—Hal Wachsman
*Assistant Examiner*—Elias Desta
(74) *Attorney, Agent, or Firm*—Baker & Daniels LLP

(57) ABSTRACT

A steering angle sensing system includes at least one steering angle sensing device for outputting an analog signal representative of a steering angle position of a steering wheel. A first processor is operably coupled to the at least one steering angle sensing device and is disposed proximate the at least one steering angle sensing device. The first processor receives the analog signals output by the at least one steering angle sensing device, computes a steering angle value based upon the analog signals, and outputs a pulse width modulated signal representative of the computed steering angle value. A second processor is disposed nonproximate the at least one steering angle sensing device and is operably coupled to the first processor to thereby receive the pulse width modulated signal representative of the computed steering angle value.

21 Claims, 5 Drawing Sheets

STEERING ANGLE SENSOR ASSEMBLY WITH PULSE WIDTH MODULATED OUTPUT SIGNAL

BACKGROUND OF THE INVENTION

1. Field of the Invention

The present invention relates to steering angle sensor assemblies and, more particularly, steering angle sensor assemblies that transmit steering angle information to a vehicle control module.

2. Description of the Related Art

A wide variety of steering angle sensor assemblies are known in the art for providing steering angle data to vehicle systems such as vehicle stabilizing systems. Such conventional steering angle sensor assemblies may be broadly classified as either "dumb" sensor assemblies or "smart" sensor assemblies. Dumb sensor assemblies typically transmit raw analog signals to the electronic control unit (ECU) of the vehicle which then analyzes the signals to determine the steering angle of the vehicle. Smart sensor assemblies, in contrast, typically include a microprocessor for processing the raw sensor signals and determining the steering angle value.

Both dumb sensor assemblies and smart sensor assemblies may include one or more sensing devices. For example, between one and three light emitting diodes (LEDs) and a corresponding number of photosensitive sensors may be positioned on opposite sides of a rotating tone ring that has slots therein. As the tone ring is rotated along with the steering wheel, the slots in the tone ring allow the LEDs to illuminate the sensors. The signals generated by the photosensitive sensors in response to the light are then analyzed to determine the steering angle position. Other forms of sensing devices may also be employed within the sensor assemblies. For example, a potentiometer-like sensing device may output an analog voltage that is indicative of which of the several possible revolutions that the tone ring is positioned in.

A drawback associated the dumb analog sensor assemblies is that each of the individual sensing devices used in the sensor assembly has a wire leading to the ECU. These wires may pick up noise or become broken. If only one of the wires is broken, the ECU may still receive signals from the remaining sensing devices and, as a result, the ECU may compute an erroneous steering angle position. Another drawback is that analog signal transmission may require a digital-to-analog converter on the sensor side, and an analog-to-digital converter at the ECU. In addition to their expense, these converters may introduce sources of error into the system.

A drawback associated with the smart sensor assemblies is that they are relatively expensive. The cost is driven up by the expense of the microprocessor located in the sensor assembly as well as the controller area network (CAN) bus that is required in order to communicate data computed by the microprocessor in the sensor assembly to the ECU.

What is needed in the art is a cost effective steering angle sensor assembly that can reliably transmit steering angle information over a single wire, or over another single conduit, to a vehicle controller.

SUMMARY OF THE INVENTION

The present invention provides a smart sensor assembly that does not require the use of a CAN bus. Instead of utilizing a microprocessor that outputs data in a digital format that requires the use of a CAN bus for communication of the data, a less expensive microprocessor that outputs a pulse width modulated (PWM) signal is used.

The invention comprises, in one form thereof, a steering angle sensing system including at least one steering angle sensing device for outputting an analog signal representative of a steering angle position of a steering wheel. A first processor is operably coupled to the at least one steering angle sensing device and is disposed proximate the at least one steering angle sensing device. The first processor receives the analog signals output by the at least one steering angle sensing device, computes a steering angle value based upon the analog signals, and outputs a pulse width modulated signal representative of the computed steering angle value. A second processor is disposed non-proximate the at least one steering angle sensing device and is operably coupled to the first processor to thereby receive the pulse width modulated signal representative of the computed steering angle value.

The invention comprises, in another form thereof, a steering angle sensing assembly including at least one steering angle sensing device outputting a first signal dependent upon a steering angle position. A first processor is operably coupled to and disposed proximate the at least one steering angle sensing device. The first processor receives the signals output by the at least one steering angle sensing device, determines a steering angle value based upon the analog signals, and transmits a second signal to a second processor over a single conductor. The second signal is representative of the determined steering angle value.

The invention comprises, in yet another form thereof, a method of sensing a steering angle, including operably coupling a first processor to at least one steering angle sensing device such that the first processor is disposed proximate the at least one steering angle sensing device. At least one analog signal is transmitted from the at least one steering angle sensing device to the first processor. The at least one analog signal is representative of a steering angle position of a steering wheel. A steering angle value is determined based upon the analog signals. A second processor is operably coupled to the first processor such that the second processor is disposed non-proximate the at least one steering angle sensing device. A pulse width modulated signal is transmitted from the first processor to the second processor. The pulse width modulated signal is representative of the determined steering angle value.

An advantage of the present invention is that it includes a microprocessor that outputs a PWM signal. Such microprocessors are widely available and are typically used to control the operation of an end use device such as a motor. Microprocessors capable of generating a PWM signal are significantly less expensive than the microprocessors commonly found in smart steering angle sensors and which output a digital signal to the ECU using a CAN bus.

Another advantage is that the use of a PWM signal allows for the communication of the signal between the sensor assembly and the ECU to be conducted over a single wire, thereby further reducing the cost of the system. Moreover, if this wire is broken, the ECU will be able to very quickly ascertain this fact. The actual time required for the ECU to determine that the wire is broken will be dependent upon the frequency of the PWM signal.

Yet another advantage is that a digital to analog converter is not needed in the sensor, thereby saving expense and removing an additional source of error.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Figure 1:
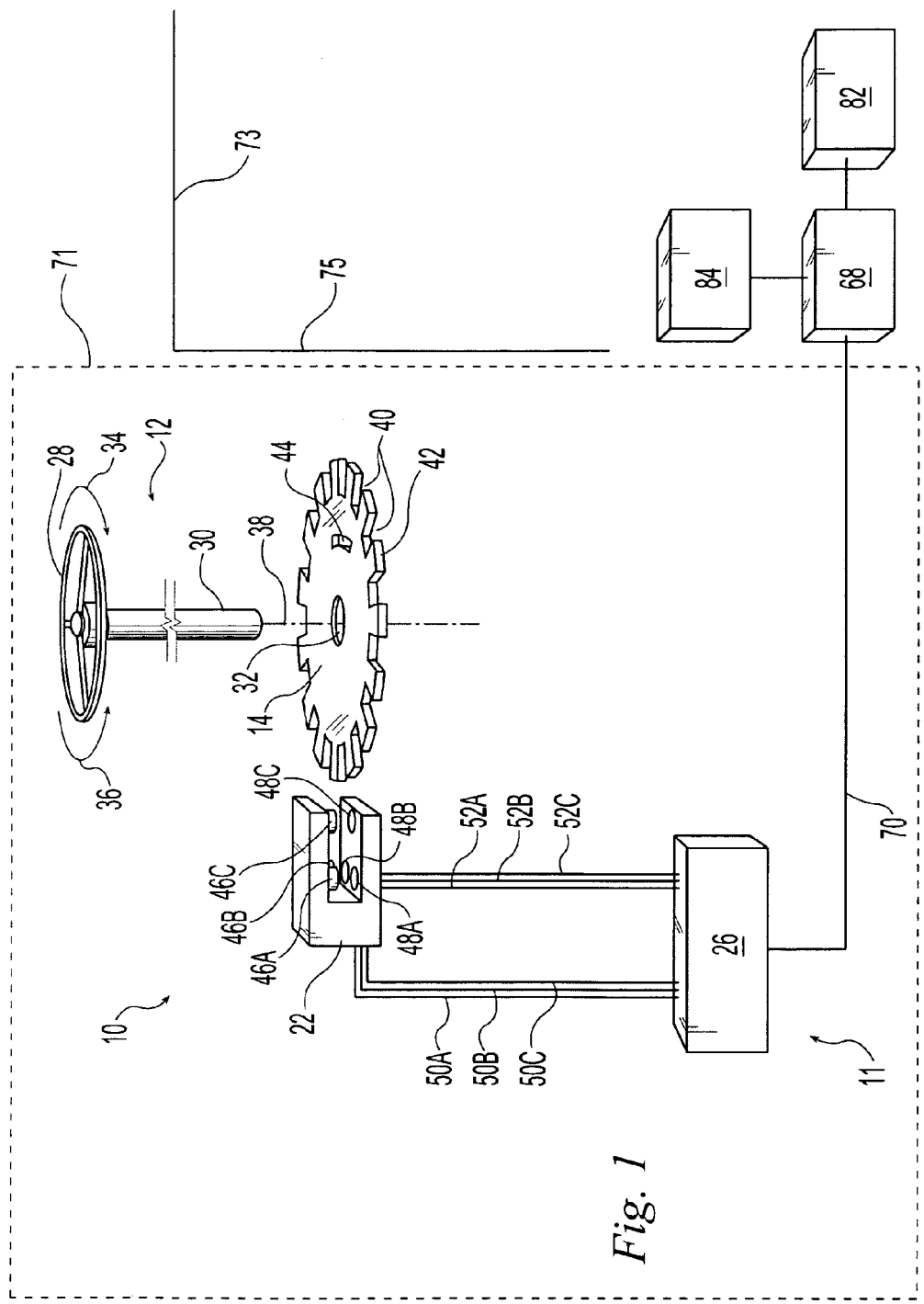
FIG. 1 is an exploded view of a steering angle sensor system in accordance with one embodiment of the present invention.

Corresponding reference characters indicate corresponding parts throughout the several views. Although the exemplification set out herein illustrates an embodiment of the invention, the embodiment disclosed below is not intended to be exhaustive or to be construed as limiting the scope of the invention to the precise form disclosed.

DESCRIPTION OF THE PRESENT INVENTION

Referring now to the drawings and particularly to FIG. 1, there is shown one embodiment of a steering wheel sensor system 10 of the present invention, including a steering wheel sensor assembly 11. Assembly 11 includes a steering mechanism 12, a rotational indexing member 14, a sensing device 22, and a sensor processor 26. Steering mechanism 12 includes a steering wheel 28 attached to a steering shaft 30.

Rotational indexing member 14 may be in the form of a tone ring that is operably coupled to steering mechanism 12 for rotation therewith. That is, tone ring 14 rotates in response to rotation of steering wheel 28. More particularly, steering shaft 30 may extend through a central throughhole 32 of tone ring 14 such that steering shaft 30 is fixedly attached to tone ring 14. Steering shaft 30 may include a groove (not shown) for receiving tone ring 14. One or more fasteners (not shown) may be used to secure tone ring 14 to steering shaft 30.

Both steering mechanism 12 and tone ring 14 are rotatable in both a clockwise direction indicated by arrow 34 and a counterclockwise direction indicated by arrow 36. Steering mechanism 12 and tone ring 14 are each rotatable through a rotational range including a plurality of revolutions. For example, steering mechanism 12 and tone ring 14 may each be rotatable through a rotational range of between four and five revolutions between a left steering lock position and a right steering lock position. In one embodiment, both steering mechanism 12 and tone ring 14 are rotatable through a rotational range of approximately 1500°, i.e., four 360° revolutions plus an additional 60°. The rotational range may be evenly split between directions to the left and directions to the right of a straight ahead steering direction. For example, the rotational range may extend 750° to the left of a straight ahead steering direction and 750° to the right of the straight ahead steering direction.

Tone ring 14 defines a rotational axis 38 which may pass approximately through the center of throughhole 32. Both steering mechanism 12 and tone ring 14 may rotate about rotational axis 38. Tone ring 14 includes a plurality of first indexing elements in the form of radially oriented, rectangular throughslots 40 adjacent a perimeter 42 of tone ring 14. Throughslots 40 may be evenly spaced around the entire perimeter 42 to thereby circumscribe axis 38. Tone ring 14 is shown as having only fifteen throughslots 40 in FIG. 1 for ease of illustration. However, it is to be understood that tone ring 14 may have one hundred or more throughslots 40. Tone ring 14 also includes a circumferentially oriented second indexing element in the form of an arcuate throughslot or index window 44 that may be disposed radially inward of throughslots 42. In one embodiment, index window 44 extends approximately between 14° and 20° in a circumferential direction around axis 38.

First sensing device 22 includes light emitters 46A, 46B, 46C arranged to emit light toward respective light detectors 48A, 48B, 48C. First sensing device 22 may be positioned such that tone ring 14 is partially disposed between light emitters 46A, 46B, 46C and light detectors 48A, 48B, 48C. More particularly, first sensing device 22 may be positioned such that light emitters 46A, 46B emit light to respective light detectors 48A, 48B through throughslots 40 of tone ring 14. Moreover, first sensing device 22 may be positioned such that arcuate index window 44 may be aligned between light emitter 46C and light detector 48C such that light emitter 46C may emit light to light detector 48C therethrough.

Sensor processor 26 may be operably coupled to, or in electrical communication with, light emitters 46 and light detectors 48. More particularly, sensor processor 26 may be operably coupled to light emitters 46A–C via respective electrical conductors 50A–C, and sensor processor 26 may be operably coupled to light detectors 48A–C via respective electrical conductors 52A–C. Sensor processor 26 may also be operably coupled to, or in electrical communication with, another processor within system 10 in the form of a vehicle controller or ECU 68. Sensor processor 26 may be in electrical communication with ECU 68 via a single electrical conductor or wire 70. Sensor processor 26 may be disposed proximate sensing device 22. For example, sensor processor 26 may be disposed in a steering column 71 and adjacent to sensing device 22. In one embodiment, sensor processor 26 and sensing device 22 are separated by a distance of one foot or less within the vehicle. In contrast, ECU 68 may be disposed non-proximate sensing device 22. That is, ECU 68 may be disposed at a location remote from sensing device 22, such as away from or outside steering column 71. More particularly, ECU 68 may be disposed under a hood 73 of the vehicle and/or behind a dashboard 75. In one embodiment, ECU 68 and sensing device 22 are separated by a distance of two feet or more within the vehicle.

ECU 68 may be operably coupled to a component 82 of a vehicle that is steered via steering mechanism 12 such that ECU 68 may control operation of component 82. For example, component 82 may be in the form of an active suspension component of the vehicle, and ECU 68 may control operation of the active suspension component based upon steering angle data that ECU 68 receives from sensor processor 26. ECU 68 may also be operably coupled to at least one other vehicle sensing device 84 to thereby receive another sensing signal therefrom. For example, vehicle sensing device 84 may be in the form of a vehicle speed sensor that transmits vehicle speed signals to ECU 68. ECU 68 may then output a control signal to an active suspension component 82 wherein the control system may be based upon both the steering angle signals received from sensor processor 26 and the vehicle speed signals received from vehicle speed sensor 84.

During use, the turning of steering wheel 28 by the user after engine ignition causes tone ring 14 to correspondingly rotate about axis 38. As tone ring 14 rotates, index window 44 passes between light emitter 46C and corresponding light detector 48C. Moreover, throughslots 40 pass between light emitters 46A, 46B and corresponding light detectors 48A, 48B. From the output signals of light detector 48C, sensor processor 26 can determine when tone ring 14 has reached a predetermined rotational position within a revolution. From the output signals of light detectors 48A, 48B, sensor processor 26 can track the rotation of tone ring 14 and thereby determine the rotational position and rotational direction of tone ring 14 without regard to which of the several possible revolutions within the 1500° rotational range in which tone ring 14 may be positioned. That is, the interaction of cutouts 40 with first sensing device 22 allows sensor processor 26 to determine the direction and magnitude of changes in the steering wheel angle. The monitoring of tone ring 14 may provide information on the rotational position of steering wheel 28 within the context of a revolution.

Figure 2:
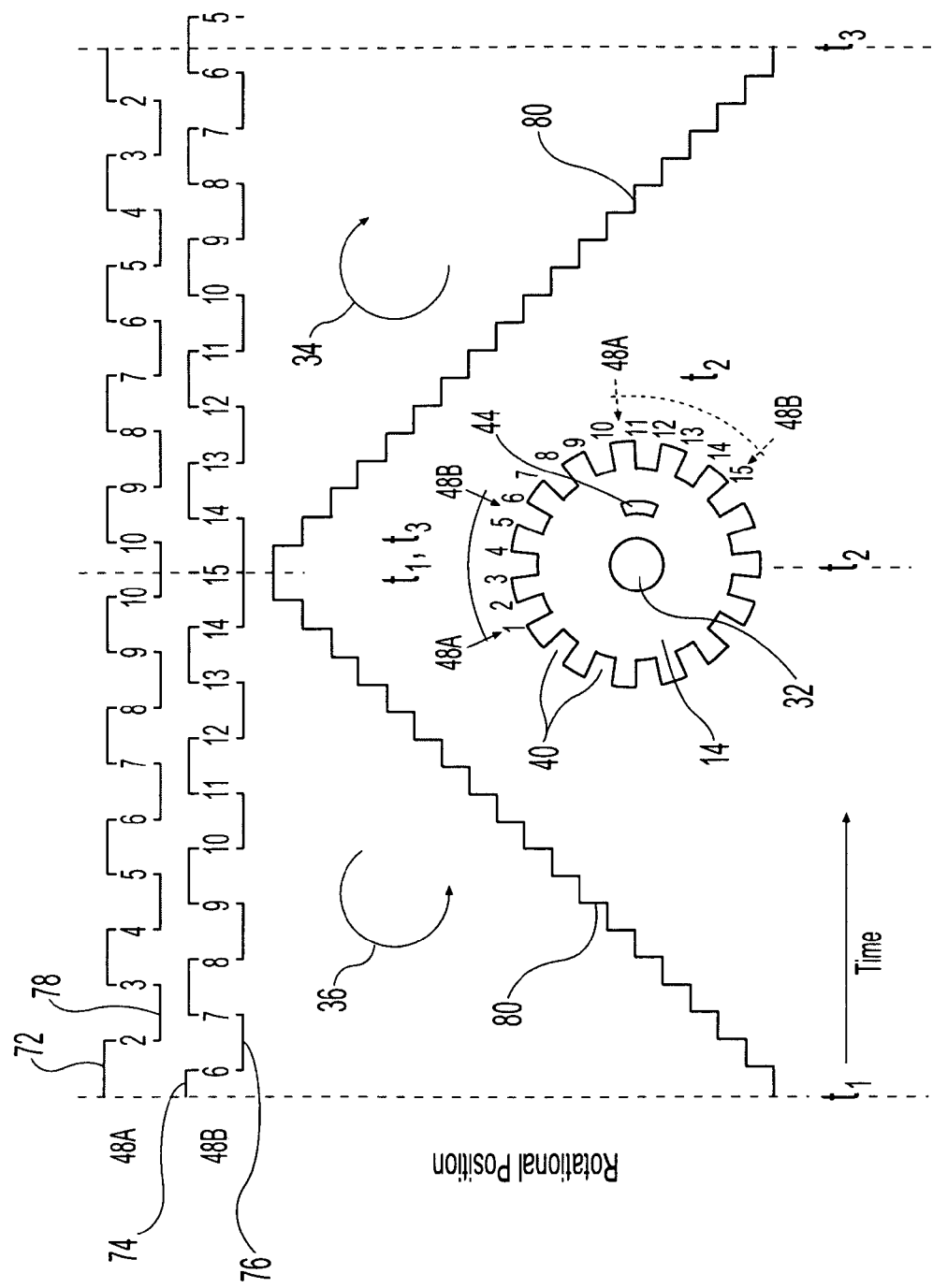
FIG. 2 is a diagram representing sensor signals precisely defining the relative steering angle position.

The output voltage of light detectors 48A, 48B as tone ring 14 rotates is illustrated near the top of the diagram of FIG. 2. The defining edges of throughslots 40 that are sensed by light detectors 48A, 48B through about half of a revolution of tone ring 14 are labeled with the numbers 1 through 15. Light detector 48B is indicated as being disposed between edges 5 and 6 at time $t_1$, and light detector 48A is disposed at edge 1. At time $t_1$, tone ring 14 begins to turn in counterclockwise direction 36. At time $t_2$, light detector 48B is disposed at edge 15 and light detector 48A is disposed between edges 10 and 11. Tone ring 14 reverses direction at time $t_2$ and begins to turn in clockwise direction 34. At time $t_3$, tone ring 14 arrives back at the same position from which it started at time $t_1$.

At time $t_1$, as tone ring 14 begins to turn in counterclockwise direction 36, light from emitter 46A begins to pass through the throughslot between edges 1 and 2 to light detector 48A. Thus, at time $t_1$, the output signal from light detector 48A goes high, as indicated at 72. Because light detector 48B is aligned with the throughslot between edges 5 and 6 at time $t_1$, the output signal of light detector 48B is high, as indicated at 74. When edge 6 reaches light detector 48B, tone ring 14 begins to block the light path between light emitter 46B and light detector 48B. The output signal of light detector 48B then goes low, as indicated at 76. A short time later, edge 2 reaches light detector 48A, and the output signal of light detector 48A goes low, as indicated at 78.

Because the signal from light detector 48A goes low immediately after the signal from light detector 48B goes low, sensor processor 26 can determine that tone ring 14 is rotating in counterclockwise direction 36. Conversely, after time $t_2$, the signal from light detector 48B goes low immediately after the signal from light detector 48A goes low, and thus sensor processor 26 can determine that tone ring 14 is rotating in clockwise direction 34.

By keeping track of the direction in which tone ring 14 is moving, and by counting the number of high-low cycles or rising/falling edges of light detectors 48A and/or 48B, sensor processor 26 can track the rotational position of tone ring 14 relative to its rotational position at engine ignition (time $t_1$). Plot 80 illustrates the rotational position of tone ring 14 as tracked by sensor processor 26 between times $t_1$ and $t_3$.

Arcuate index window 44 of tone ring 14 cooperates with first sensing device 22 to identify a predefined position within each 360° rotation of tone ring 14. More particularly, index window 44 allows light emitted from light emitter 46C to reach light detector 48C once per rotation of tone ring 14. Index window 44 provides a reference with which the rotational position of tone ring 14 can be specified.

Figure 3:
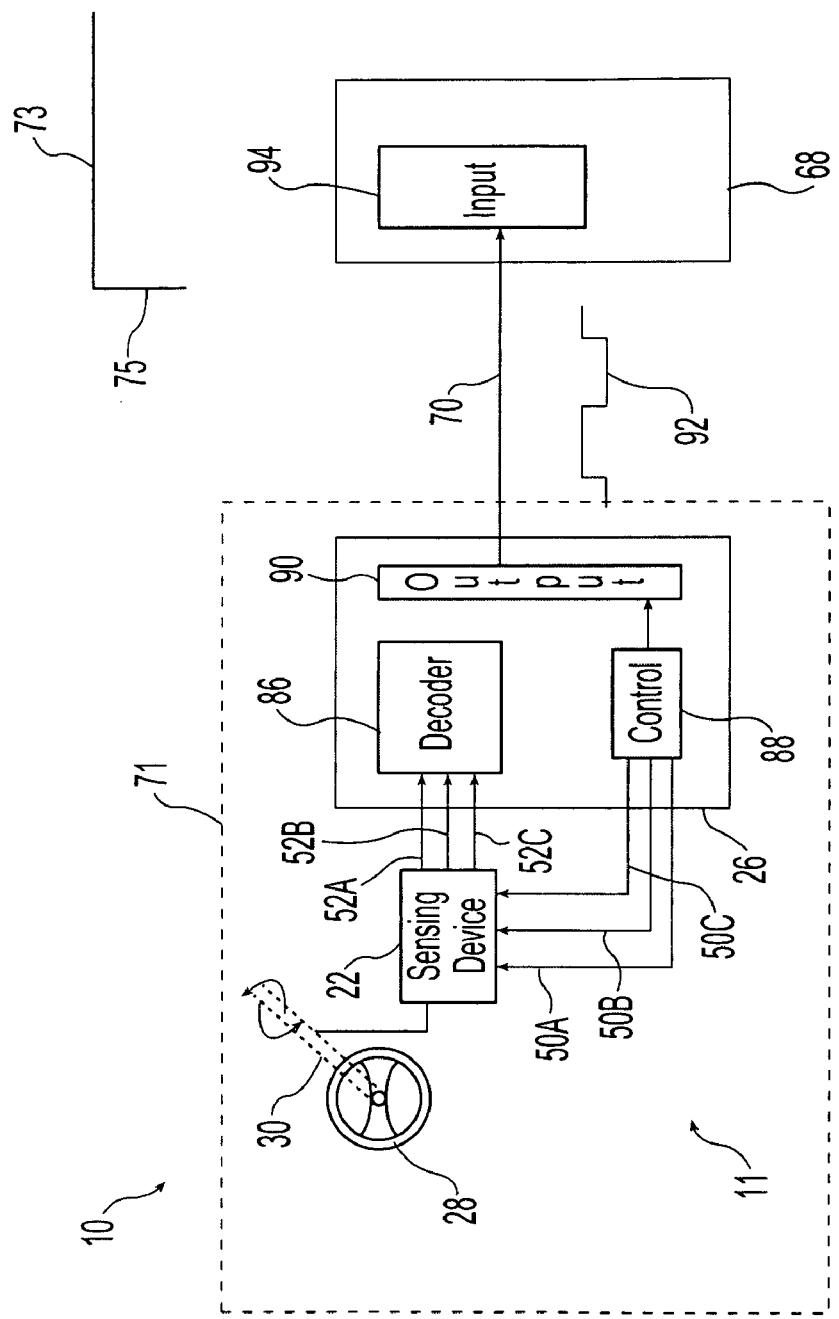
FIG. 3 is a block diagram of the steering angle sensor system of FIG. 1.

FIG. 3 is a functional block diagram of steering wheel sensor system 10. Sensor processor 26 includes a decoder block 86 that decodes the analog signals received on conductors 52A–C from light detectors 48A–C, respectively. A control block 88 may compute or otherwise determine a steering angle value based upon the decoded analog signals. Control block 88 may then produce a pulse width modulated (PWM) signal representative of the computed steering angle, and transmit the PWM signal to output block 90. Control block 88 may also control the operation of light emitters 46A–C via conductors 50A–C. Output block 90 may output the PWM signal, indicated at 92, over a PWM interface such as single conductor 70 to an input 94 of ECU 68.

Figures 4A, 4B, 4C:
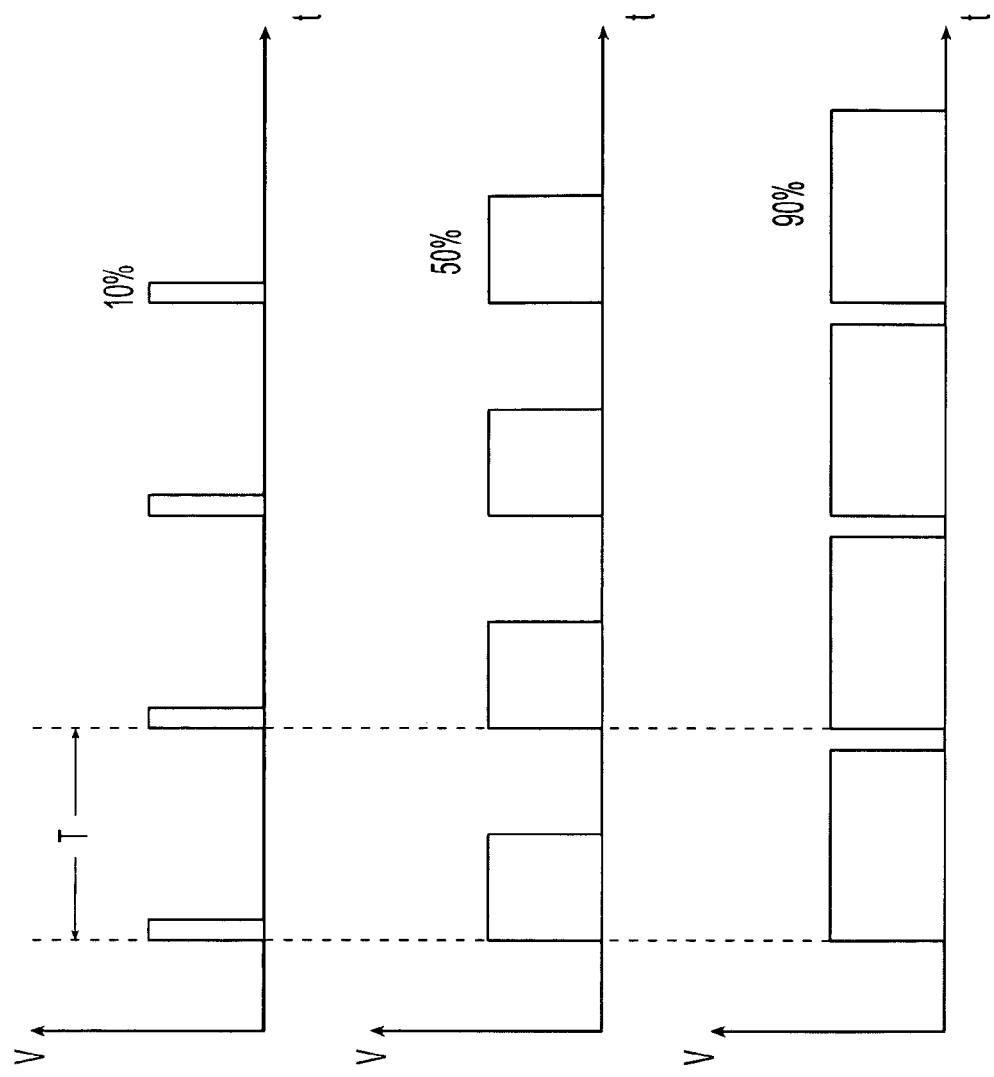
FIG. 4a is a plot of the pulse width modulated signal, at 10% duty cycle, that is output by the sensor processor of the system of FIG. 1.
FIG. 4b is a plot of the pulse width modulated signal, at 50% duty cycle, that is output by the sensor processor of the system of FIG. 1.
FIG. 4c is a plot of the pulse width modulated signal, at 90% duty cycle, that is output by the sensor processor of the system of FIG. 1.

In one embodiment, a duty cycle of the PWM signal may be indicative of the steering angle computed by sensor processor 26. More particularly, the duty cycle of the PWM signal may vary linearly with the computed steering angle value. For example, the steering angle may have a range of four full 360° rotations, i.e., two full rotations to either side of dead center, straight ahead steering. Thus, the range of the steering angle value may be designated as extending from −720° to +720°. The duty cycle of the PWM signal may then be varied linearly within the range of −720° to +720°. In one embodiment, the duty cycle may range from a minimum of 10% as shown in FIG. 4a to a maximum of 90% as shown in FIG. 4c. Specifically, the duty cycle may be 10% when the steering angle is −720°, 50% as shown in FIG. 4b when the steering angle is 0° dead center, and 90% when the steering angle is +720°. The duty cycle may vary linearly between these points such that each 18° movement in the steering angle corresponds to 1% in the duty cycle (1440°/80%=18°/1%).

Steering angle position information is carried from sensing device 22 to sensor processor 26 on three separate conductors 52A–C. Advantageously, the PWM signal representative of the computed steering angle value may be outputted by sensor processor 26 on a single electrical conductor 70. That is, a single conductor 70 may carry an entirety of PWM signal 92 from sensor processor 26 to ECU 68. Moreover, the single electrical conductor may be a simple wire as opposed to a more complicated and expensive bus, such as a CAN bus.

Another advantage is that, because only a single conductor 70 is used, ECU 68 may quickly and easily sense an absence of the PWM signal on conductor 70. For example, if the PWM signal has a fixed period or frequency and a duty cycle that is maintained above zero, ECU 68 may determine that the PWM signal is absent if a high voltage level has not been received by input 94 in a time period equal to the period of the PWM signal. As illustrated in FIGS. 4a–c, a period T of the PWM signal may remain constant as the duty cycle varies. That is, if the PWM signal has a frequency of 1000 Hz, which results in a period of one millisecond, ECU 68 may determine that the PWM signal is absent if a high voltage level has not been received by input 94 within the immediately preceding one millisecond time period. Thus, a breakage or discontinuity in conductor 70, or some other malfunction such as an inoperable sensing device 22, can be quickly and reliably sensed. Moreover, ECU 68 may quickly and reliably detect if conductor 70 has been electrically short circuited to ground, to battery, or to some other voltage signal.

The frequency of the PWM signal may be set according to how often ECU 68 needs an update of the steering angle. In one embodiment, the frequency of the PWM signal may range from approximately 100 Hz to 10 kHz.

Figure 5:
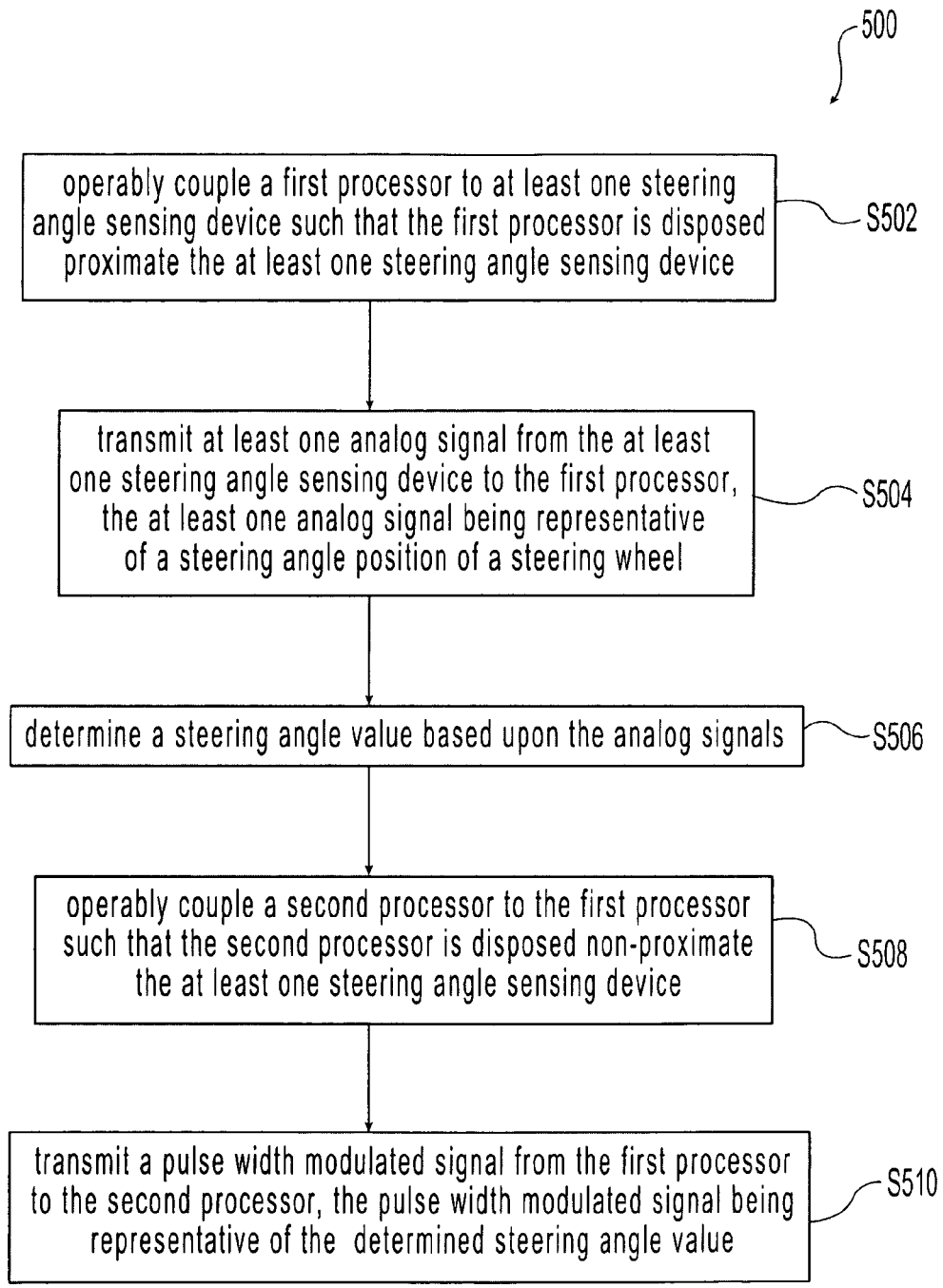
FIG. 5 is a flow chart in accordance with one embodiment of a method of the present invention for sensing a steering angle.

One embodiment of a method 500 of the present invention for sensing a steering angle is illustrated in FIG. 5. In general, method 500 may include transmitting a signal from a steering angle sensing device to a proximate first processor, determining a steering angle value based upon the signal, and transmitting a PWM signal representative of the steering angle value from the first processor to a second processor disposed non-proximate to the steering angle sensing device.

In a first step S502, a first processor is operably coupled to at least one steering angle sensing device such that the first processor is disposed proximate the at least one steering angle sensing device. For example, in one embodiment, sensor processor 26 is operably coupled to sensing device 22 such that sensor processor 26 is disposed proximate sensing device 22.

In a next step S504, at least one analog signal is transmitted from the at least one steering angle sensing device to the first processor, the at least one analog signal being representative of a steering angle position of a steering wheel. For example, analog signals representative of a steering angle position of steering wheel 28 may be transmitted from sensing device 22 to sensor processor 26.

Next, in step S506, a steering angle value is determined based upon the analog signals. In the embodiment disclosed herein, sensor processor 26 may receive the analog signals from sensing device 22, and calculate or otherwise determine a steering angle value based upon the analog signals.

In a next step S508, a second processor is operably coupled to the first processor such that the second processor is disposed non-proximate the at least one steering angle sensing device. For example, ECU 68 may be operably coupled to sensor processor 26 such that ECU 68 is disposed non-proximate sensing device 22. That is, ECU 68 may be disposed at a location remote from sensing device 22.

In a final step S510, a pulse width modulated signal is transmitted from the first processor to the second processor, wherein the pulse width modulated signal is representative of the determined steering angle value. In one embodiment, a PWM signal representative of the steering angle value determined by sensor processor 26 is transmitted from sensor processor 26 to ECU 68 over one electrical conductor 70.

The PWM interface between sensor processor 26 and ECU 68 has been described herein as being a single electrical conductor. However, it is also possible within the scope of the present invention for the PWM interface to be in another form. For example, the PWM interface may be in the form of a light conduit for carrying pulse width modulated light signals from a light emitter associated with the sensor processor to a light detector associated with the ECU.

The steering angle sensor system of the present invention has been described herein as being advantageous for transmitting steering angle information from a steering angle sensing device to an ECU that is disposed at a location remote from the sensing device via a sensor processor disposed proximate the sensing device. However, the present invention may also be advantageous in applications wherein both the sensor processor and the ECU are disposed proximate the sensing device, and in applications wherein both the sensor processor and the ECU are disposed at a location remote from the sensing device. For example, in an application wherein there is only limited cross-sectional area through which to carry steering angle information from the sensing device to the ECU, such as in the presence of a barrier such as an engine fire wall, it may be advantageous to transmit the steering angle information on a single conductor via a PWM signal.

The steering angle sensor system of the present invention has been described herein as monitoring the rotation of the steering wheel and determining its position after vehicle ignition. However, it is also possible within the scope of the invention for the steering angle sensor system to begin operating before vehicle ignition. For example, power may be supplied to the sensing device, the sensor processor, and the ECU when the operator places the key in an "accessory power" position wherein the vehicle battery is electrically connected to various accessories, but ignition is not applied to the engine or motor of the vehicle. This may be particularly useful in applications where the steering wheel can be turned without any power assist from the engine.

The light emitters 46A–C of sensor device 22 have been described herein as being controlled by sensor processor 26. However, it is also possible for light emitters 46A–C to be connected directly to battery power such that emitters 46A–C emit light whenever the key is in the ignition position or the accessory position.

While this invention has been described as having an exemplary design, the present invention may be further modified within the spirit and scope of this disclosure. This application is therefore intended to cover any variations, uses, or adaptations of the invention using its general principles.

What is claimed is:

1. A steering angle sensing system comprising:
   at least one steering angle sensing device configured to output an analog signal representative of a steering angle position of a steering wheel;
   a first processor operably coupled to said at least one steering angle sensing device, said first processor being configured to:
   receive the analog signals output by said at least one steering angle sensing device;
   compute a steering angle value based upon the analog signals; and
   output a pulse width modulated signal representative of the computed steering angle value; and
   a second processor operably coupled to said first processor to thereby receive the pulse width modulated signal representative of the computed steering angle value.

2. The steering angle sensor system of claim 1 wherein said second processor is configured to output a control signal to control operation of at least one component of a vehicle steered via the steering wheel.

3. The steering angle sensor system of claim 2 wherein said second processor is configured to be operably coupled to at least one other vehicle sensing device to thereby receive another signal from the other vehicle sensing device.

4. The steering angle sensor system of claim 1 further comprising a single conductor configured to carry an entirety of the pulse width modulated signal from said first processor to said second processor.

5. The steering angle sensor system of claim 4 wherein said second processor is configured to sense an absence of the pulse width modulated signal on the single conductor.

6. The steering angle sensor system of claim 1 wherein said first processor is disposed proximate said at least one steering angle sensing device and said second processor is disposed at a location remote from said at least one steering angle sensing device.

7. The steering angle sensor system of claim 1 wherein a duty cycle of the pulse width modulated signal is indicative of the computed steering angle value.

8. The steering angle sensor system of claim 7 wherein the duty cycle of the pulse width modulated signal varies linearly with the computed steering angle value.

9. A steering angle sensor assembly comprising:
at least one steering angle sensing device configured to output a first signal dependent upon a steering angle position; and
a first processor operably coupled said at least one steering angle sensing device, said first processor being configured to:
receive the signals output by said at least one steering angle sensing device;
determine a steering angle value based upon the analog signals; and
transmit a second signal to a second processor over a single conductor, wherein the second signal is representative of the determined steering angle value.

10. The steering angle sensor assembly of claim 9 wherein said first processor is disposed proximate said at least one steering angle sensing device and said second processor is disposed remotely from said at least one steering angle sensing device.

11. The steering angle sensor assembly of claim 9 wherein the second signal comprises a pulse width modulated signal.

12. The steering angle sensor assembly of claim 11 wherein a duty cycle of the pulse width modulated signal is indicative of the determined steering angle value.

13. The steering angle sensor assembly of claim 12 wherein the duty cycle of the pulse width modulated signal varies linearly with the determined steering angle value.

14. A method of sensing a steering angle, comprising the steps of:
operably coupling a first processor to at least one steering angle sensing device; transmitting at least one analog signal from said at least one steering angle sensing device to said first processor, the at least one analog signal being representative of a steering angle position of a steering wheel;
determining a steering angle value based upon the analog signals;
operably coupling a second processor to said first processor; and
transmitting a pulse width modulated signal from said first processor to said second processor, the pulse width modulated signal being representative of the determined steering angle value.

15. The method of claim 14 comprising the further step of outputting a control signal from said second processor to control operation of at least one component of a vehicle steered via the steering wheel.

16. The method of claim 15 comprising the further steps of:
operably coupling said second processor to at least one other vehicle sensing device; and
transmitting another signal from the other vehicle sensing device to said second processor.

17. The method of claim 14 comprising the further step of carrying an entirety of the pulse width modulated signal on a single conductor from said first processor to said second processor.

18. The method of claim 17 comprising the further step of using said second processor to sense an absence of the pulse width modulated signal on the single conductor.

19. The method of claim 14 wherein said first processor is disposed proximate said at least one steering angle sensing device and said second processor is disposed at a location remote from said at least one steering angle sensing device.

20. The method of claim 14 wherein a duty cycle of the pulse width modulated signal is indicative of the computed steering angle value.

21. The method of claim 20 wherein the duty cycle of the pulse width modulated signal varies linearly with the computed steering angle value.

* * * * *